US009491794B2

(12) United States Patent
Zhang et al.

(10) Patent No.: US 9,491,794 B2
(45) Date of Patent: Nov. 8, 2016

(54) METHOD FOR QUICKLY ESTABLISHING TRUNKING SERVICE AND RELATED DEVICE AND SYSTEM

(71) Applicant: Huawei Technologies Co., Ltd., Shenzhen, Guangdong (CN)

(72) Inventors: Lixue Zhang, Beijing (CN); Xin Xiong, Beijing (CN); Weihua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 101 days.

(21) Appl. No.: 14/660,606

(22) Filed: Mar. 17, 2015

(65) Prior Publication Data
US 2015/0189691 A1 Jul. 2, 2015

Related U.S. Application Data

(63) Continuation of application No. PCT/CN2013/083655, filed on Sep. 17, 2013.

(30) Foreign Application Priority Data

Sep. 17, 2012 (CN) .......................... 2012 1 0344096

(51) Int. Cl.
*H04W 4/00* (2009.01)
*H04W 76/04* (2009.01)
(Continued)

(52) U.S. Cl.
CPC .......... *H04W 76/048* (2013.01); *H04L 5/0007* (2013.01); *H04W 52/0212* (2013.01);
(Continued)

(58) Field of Classification Search
USPC ............. 370/230, 230.1, 236, 252, 311, 328, 370/329, 330, 340, 341
See application file for complete search history.

(56) References Cited

U.S. PATENT DOCUMENTS 5,649,298 A * 7/1997 Ablay ................... H04W 84/08
455/520
5,960,360 A * 9/1999 Carmon ................ H04W 76/02
370/347
(Continued)

FOREIGN PATENT DOCUMENTS

CN 101483446 A 7/2009
CN 102111881 A 6/2011
(Continued)

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.2.0, Sep. 2013, 293 pages.
(Continued)

*Primary Examiner* — Kwang B Yao
*Assistant Examiner* — Nguyen Ngo

(57) ABSTRACT

The present invention discloses a method for quickly establishing a trunking service. The method includes: receiving, by a base station device, indication information that a user equipment has entered a trunking service mode, where the indication information is sent by an evolved packet core network device; responding to the indication information, and creating a radio resource control connection with the user equipment; responding to the indication information, and generating radio resource connection configuration information including a discontinuous reception cycle; sending the radio resource connection configuration information to the user equipment, so that the user equipment configures the discontinuous reception cycle as a discontinuous reception cycle of the user equipment itself; and when the user equipment is in the trunking service mode, retaining the radio resource control connection with the user equipment according to the radio resource connection configuration information.

18 Claims, 9 Drawing Sheets

(51) Int. Cl.
*H04L 5/00* (2006.01)
*H04W 52/02* (2009.01)
*H04W 72/08* (2009.01)
*H04W 76/00* (2009.01)
*H04W 76/02* (2009.01)
*H04W 4/10* (2009.01)
*H04W 88/06* (2009.01)

(52) U.S. Cl.
CPC ......... *H04W72/087* (2013.01); *H04W 76/005* (2013.01); *H04W 76/021* (2013.01); *H04W 4/10* (2013.01); *H04W 76/02* (2013.01); *H04W 88/06* (2013.01)

(56) References Cited

U.S. PATENT DOCUMENTS

| | | | |
|---|---|---|---|
| 5,973,640 | A | 10/1999 | Lee |
| 2004/0190483 | A1* | 9/2004 | Shahaf ............... H04W 84/08 370/347 |
| 2006/0003784 | A1* | 1/2006 | Chion ................ H04W 4/10 455/518 |
| 2010/0260160 | A1* | 10/2010 | Wu ................... H04W 68/02 370/342 |
| 2011/0122783 | A1 | 5/2011 | Lin et al. |
| 2011/0134836 | A1 | 6/2011 | Lin et al. |
| 2011/0134888 | A1 | 6/2011 | Lin et al. |
| 2011/0199910 | A1* | 8/2011 | Oh .................... H04W 52/0229 370/241 |
| 2012/0033595 | A1 | 2/2012 | Aoyama et al. |
| 2012/0046062 | A1* | 2/2012 | Namm ............... H04W 4/10 455/520 |
| 2013/0163497 | A1 | 6/2013 | Wei |
| 2015/0038184 | A1* | 2/2015 | Macafee ............ H04W 76/02 455/509 |
| 2015/0319691 | A1 | 11/2015 | Wei |
| 2016/0029309 | A1* | 1/2016 | Kim .................. H04W 52/0258 370/311 |
| 2016/0088681 | A1* | 3/2016 | Chang ............... H04W 76/048 455/405 |

FOREIGN PATENT DOCUMENTS

| | | |
|---|---|---|
| CN | 102137337 A | 7/2011 |
| CN | 102413587 A | 4/2012 |
| CN | 102448151 A | 5/2012 |
| JP | 2012527842 A | 11/2012 |
| RU | 2145773 C1 | 2/2000 |
| WO | WO 2010/135467 A1 | 11/2010 |
| WO | WO 2012/041075 A1 | 4/2012 |
| WO | WO 2012/058924 A1 | 5/2012 |

OTHER PUBLICATIONS

"Benefits of UE role in selecting DRX parameters", Qualcomm Incorporated, 3GPP TSG-RAN2 Meeting #77b, Mar. 26-30, 2012, 3 pages, R2-121774.

"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.5.0, Mar. 2012, 54 pages.

3rd Generation Partnership Project; Technical Specification Group Services and System Aspects; Policy and charging control architecture (Release 11); 3GPP TS 23.203 V11.7.0, Sep. 2012, 178 pages.

"3rd Generation Partnership Project; Technical Specification Group Radio Access Network; Evolved Universal Terrestrial Radio Access Network (E-UTRAN); S1 Application Protocol (S1AP)(Release 11)", 3GPP TS 36.413 V11.0.0, Jun. 2012, 258 pages.

* cited by examiner

METHOD FOR QUICKLY ESTABLISHING TRUNKING SERVICE AND RELATED DEVICE AND SYSTEM

CROSS-REFERENCE TO RELATED APPLICATIONS

This application is a continuation of International Application No. PCT/CN2013/083655, filed on Sep. 17, 2013, which claims priority to Chinese Patent Application No. 201210344096.4, filed on Sep. 17, 2012, both of which are hereby incorporated by reference in their entireties.

TECHNICAL FIELD

The present invention relates to the field of trunking services, and in particular, to a method for quickly establishing a trunking service and a related device and system.

BACKGROUND

With the development of a Long Term Evolution (LTE) network, a trunking service has been implemented on the LTE network. On an LTE network, after a user equipment (UE) is attached to the LTE network, if there is no service request for a long time, the UE enters an idle (RRC_IDLE) state; and after a service request arrives, the UE initiates a radio resource control (RRC) connection, so that the UE enters a connected (RRC_CONNECTED) state. In the RRC_CONNECTED state, a UE may choose to listen to a radio channel at some moments by using a discontinuous reception (DRX) mechanism and enters a sleep state at some moments, so that power consumption of the UE can be reduced. When no service arrives for a long time, the network releases the RRC connection to the UE, so that the UE returns to the RRC_IDLE state; and in the RRC_IDLE state, the UE may listen to a calling channel and a broadcast channel according to a DRX cycle, where the DRX cycle is also called a paging cycle of the UE, and a value of the DRX cycle is generally at a level of seconds.

For a UE that needs to quickly initiate a trunking service, a transition time from the RRC_IDLE state to the RRC_CONNECTED state cannot meet a delay requirement for quickly establishing a trunking service.

SUMMARY

Embodiments of the present invention provide a method for quickly establishing a trunking service and a related device and system, which can quickly establish a trunking service.

A first aspect of the embodiments of the present invention provides a method for quickly establishing a trunking service, including:

receiving, by a base station device, indication information that a user equipment has entered a trunking service mode, where the indication information is sent by an evolved packet core network device;

responding, by the base station device, to the indication information, and creating a radio resource control connection with the user equipment;

responding, by the base station device, to the indication information, and generating radio resource connection configuration information including a discontinuous reception cycle;

sending, by the base station device, the radio resource connection configuration information to the user equipment, so that the user equipment configures the discontinuous reception cycle as a discontinuous reception cycle of the user equipment itself; and when the user equipment is in the trunking service mode, retaining, by the base station device, the radio resource control connection with the user equipment according to the radio resource connection configuration information.

In a first possible implementation manner of the first aspect, the receiving, by a base station device, indication information that a user equipment has entered a trunking service mode, where the indication information is sent by an evolved packet core network device includes:

receiving, by the base station device, a bearer establishment request or a context modification request sent by the evolved packet core network device, where the request carries a quality of service class identifier parameter of a trunking service bearer, and the quality of service class identifier parameter of the trunking service bearer is used to instruct the user equipment to enter the trunking service mode.

In a second possible implementation manner of the first aspect, the receiving, by a base station device, indication information that a user equipment has entered a trunking service mode, where the indication information is sent by an evolved packet core network device includes:

receiving, by the base station device, a bearer establishment request or a context modification request sent by the evolved packet core network device, where the request carries a trunking service identifier, and the trunking service identifier is used to instruct the user equipment to enter the trunking service mode.

In a third possible implementation manner of the first aspect, the responding, by the base station device, to the indication information, and creating a radio resource control connection with the user equipment includes:

responding, by the base station device, to the indication information, and sending a radio resource control connection reconfiguration request to the user equipment; and receiving, by the base station device, a radio resource control connection reconfiguration completion response returned by the user equipment.

With reference to the first aspect or the first, the second, or the third possible implementation manner of the first aspect, in a fourth possible implementation manner, the responding, by the base station device, to the indication information, and generating radio resource connection configuration information including a discontinuous reception cycle includes:

responding, by the base station device, to the indication information, and generating the radio resource connection configuration information including a first discontinuous reception cycle and a second discontinuous reception cycle, where the first discontinuous reception cycle is smaller than the second discontinuous reception cycle.

With reference to the fourth possible implementation manner of the first aspect, in a fifth possible implementation manner, the method further includes:

sending, by the base station device, a discontinuous reception command of entering the trunking service mode to the user equipment, where the command is used to: when the user equipment is in the trunking service mode, instruct the user equipment to retain, by using the first discontinuous reception cycle, a short-cycle discontinuous reception state, and close a discontinuous reception short cycle timer.

A second aspect of the embodiments of the present invention provides a method for quickly establishing a trunking service, including:

sending, by a user equipment by using an evolved packet core network device, indication information that the user equipment has entered a trunking service mode to a base station device, so as to trigger the base station device to create a radio resource control connection with the user equipment, generate radio resource connection configuration information including a discontinuous reception cycle, and send the radio resource connection configuration information to the user equipment;

receiving, by the user equipment, the radio resource connection configuration information that is sent by the base station device and includes the discontinuous reception cycle, and configuring the discontinuous reception cycle as a discontinuous reception cycle of the user equipment itself; and when the user equipment is in the trunking service mode, retaining the radio resource control connection with the base station device according to the radio resource connection configuration information.

In a first possible implementation manner of the second aspect, the sending, by a user equipment by using an evolved packet core network device, indication information that the user equipment has entered a trunking service mode to a base station device includes:

sending, by the user equipment by using the evolved packet core network device, a bearer establishment request or a context modification request to the base station device, where the request carries a quality of service class identifier parameter of a trunking service bearer, and the quality of service class identifier parameter of the trunking service bearer is used to instruct the user equipment to enter the trunking service mode.

In a second possible implementation manner of the second aspect, the sending, by a user equipment by using an evolved packet core network device, indication information that the user equipment has entered a trunking service mode to a base station device includes:

sending, by the user equipment by using the evolved packet core network device, a bearer establishment request or a context modification request to the base station device, where the request carries a trunking service identifier, and the trunking service identifier is used to instruct the user equipment to enter the trunking service mode.

With reference to the second aspect or the first or the second possible implementation manner of the second aspect, in a third possible implementation manner, the receiving, by the user equipment, the radio resource connection configuration information that is sent by the base station device and includes the discontinuous reception cycle, and configuring the discontinuous reception cycle as a discontinuous reception cycle of the user equipment itself includes:

receiving, by the user equipment, the radio resource connection configuration information that is sent by the base station device and includes a first discontinuous reception cycle and a second discontinuous reception cycle, where the first discontinuous reception cycle is smaller than the second discontinuous reception cycle; and configuring, by the user equipment, the first discontinuous reception cycle or the second discontinuous reception cycle as the discontinuous reception cycle of the user equipment itself.

With reference to the third possible implementation manner of the second aspect, in a fourth possible implementation manner, when the user equipment is in the trunking service mode, the user equipment automatically closes or closes, according to an instruction of the base station device, a discontinuous reception short cycle timer, and uses the first discontinuous reception cycle; and when the user equipment exits the trunking service mode, the user equipment automatically activates or activates, according to an instruction of the base station device, the discontinuous reception short cycle timer, and uses the second discontinuous reception cycle after the discontinuous reception short cycle timer expires.

A third aspect of the embodiments of the present invention provides a base station device, including:

a receiving unit, configured to receive indication information that a user equipment has entered a trunking service mode, where the indication information is sent by an evolved packet core network device;

a creating unit, configured to respond to the indication information received by the receiving unit, and create a radio resource control connection with the user equipment;

a generating unit, configured to respond to the indication information received by the receiving unit, and generate radio resource connection configuration information including a discontinuous reception cycle;

a sending unit, configured to send the radio resource connection configuration information generated by the generating unit to the user equipment, so that the user equipment configures the discontinuous reception cycle as a discontinuous reception cycle of the user equipment itself; and a retaining unit, configured to: when the user equipment is in the trunking service mode, retain the radio resource control connection with the user equipment according to the radio resource connection configuration information generated by the generating unit.

In a first possible implementation manner of the third aspect, the receiving unit is specifically configured to receive a bearer establishment request or a context modification request sent by the evolved packet core network device, where the request carries a quality of service class identifier parameter of a trunking service bearer, and the quality of service class identifier parameter of the trunking service bearer is used to instruct the user equipment to enter the trunking service mode.

In a second possible implementation manner of the third aspect, the receiving unit is specifically configured to receive a bearer establishment request or a context modification request sent by the evolved packet core network device, where the request carries a trunking service identifier, and the trunking service identifier is used to instruct the user equipment to enter the trunking service mode.

In a third possible implementation manner of the third aspect, the creating unit is specifically configured to respond to the indication information received by the receiving unit, send a radio resource control connection reconfiguration request to the user equipment, and receive a radio resource control connection reconfiguration completion response returned by the user equipment.

With reference to the third aspect or the first, the second, or the third possible implementation manner of the third aspect, in a fourth possible implementation manner, the generating unit is specifically configured to respond to the indication information received by the receiving unit, and generate the radio resource connection configuration information including a first discontinuous reception cycle and a second discontinuous reception cycle, where the first discontinuous reception cycle is smaller than the second discontinuous reception cycle.

With reference to the fourth possible implementation manner of the third aspect, in a fifth possible implementation manner, the sending unit is further configured to send a discontinuous reception command of entering the trunking service mode to the user equipment, where the command is used to: when the user equipment is in the trunking service mode, instruct the user equipment to retain, by using the first discontinuous reception cycle, a short-cycle discontinuous reception state, and close a discontinuous reception short cycle timer.

A fourth aspect of the embodiments of the present invention provides a user equipment, including:

a sending unit, configured to send, by using an evolved packet core network device, indication information that the user equipment has entered a trunking service mode to a base station device, so as to trigger the base station device to create a radio resource control connection with the user equipment, generate radio resource connection configuration information including a discontinuous reception cycle, and send the radio resource connection configuration information to the user equipment;

a receiving unit, configured to: after the sending unit sends, by using the evolved packet core network device, the indication information that the user equipment has entered the trunking service mode to the base station device, receive the radio resource connection configuration information that is sent by the base station device and includes the discontinuous reception cycle;

a configuring unit, configured to configure the discontinuous reception cycle received by the receiving unit as a discontinuous reception cycle of the user equipment itself; and a retaining unit, configured to: when the user equipment is in the trunking service mode, retain the radio resource control connection with the base station device according to the radio resource connection configuration information received by the receiving unit.

In a first possible implementation manner of the fourth aspect, the sending unit is specifically configured to send a bearer establishment request or a context modification request to the base station device by using the evolved packet core network device, where the request carries a quality of service class identifier parameter of a trunking service bearer, and the quality of service class identifier parameter of the trunking service bearer is used to instruct the user equipment to enter the trunking service mode.

In a second possible implementation manner of the fourth aspect, the sending unit is specifically configured to send a bearer establishment request or a context modification request to the base station device by using the evolved packet core network device, where the request carries a trunking service identifier, and the trunking service identifier is used to instruct the user equipment to enter the trunking service mode.

With reference to the fourth aspect or the first or the second possible implementation manner of the fourth aspect, in a third possible implementation manner, the receiving unit is specifically configured to receive the radio resource connection configuration information that is sent by the base station device and includes a first discontinuous reception cycle and a second discontinuous reception cycle, where the first discontinuous reception cycle is smaller than the second discontinuous reception cycle; and the configuring unit is specifically configured to configure the first discontinuous reception cycle or the second discontinuous reception cycle that are received by the receiving unit as the discontinuous reception cycle of the user equipment itself.

With reference to the third possible implementation manner of the fourth aspect, in a fourth possible implementation manner, the retaining unit is further configured to: when the user equipment is in the trunking service mode, automatically close or close, according to an instruction of the base station device, a discontinuous reception short cycle timer, and use the first discontinuous reception cycle; and when the user equipment exits the trunking service mode, automatically activate or activate, according to an instruction of the base station device, the discontinuous reception short cycle timer, and use the second discontinuous reception cycle after the discontinuous reception short cycle timer expires.

A fifth aspect of the embodiments of the present invention provides a system for quickly establishing a trunking service, including the base station device provided in the third aspect, the user equipment provided in the fourth aspect, and an evolved packet core network device, where:

the evolved packet core network device is configured to send indication information that the user equipment has entered a trunking service mode to the base station device.

In a first possible implementation manner of the fifth aspect, the evolved packet core network device is specifically configured to send a bearer establishment request or a context modification request to the base station device, where the request carries a quality of service class identifier parameter of a trunking service bearer, and the quality of service class identifier parameter of the trunking service bearer is used to instruct the user equipment to enter the trunking service mode.

In a second possible implementation manner of the fifth aspect, the evolved packet core network device is specifically configured to send a bearer establishment request or a context modification request to the base station device, where the request carries a trunking service identifier, and the trunking service identifier is used to instruct the user equipment to enter the trunking service mode.

In embodiments of the present invention, a base station device can continuously retain an RRC connection with a UE that is in a trunking service mode. In this way, when a new service arrives, service transmission can be directly performed, and the UE can perform service transmission without the need of transferring from an RRC_IDLE state to an RRC_CONNECTED state, so that a delay for establishing a trunking service can be reduced significantly and quick establishment of a trunking service is ensured.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
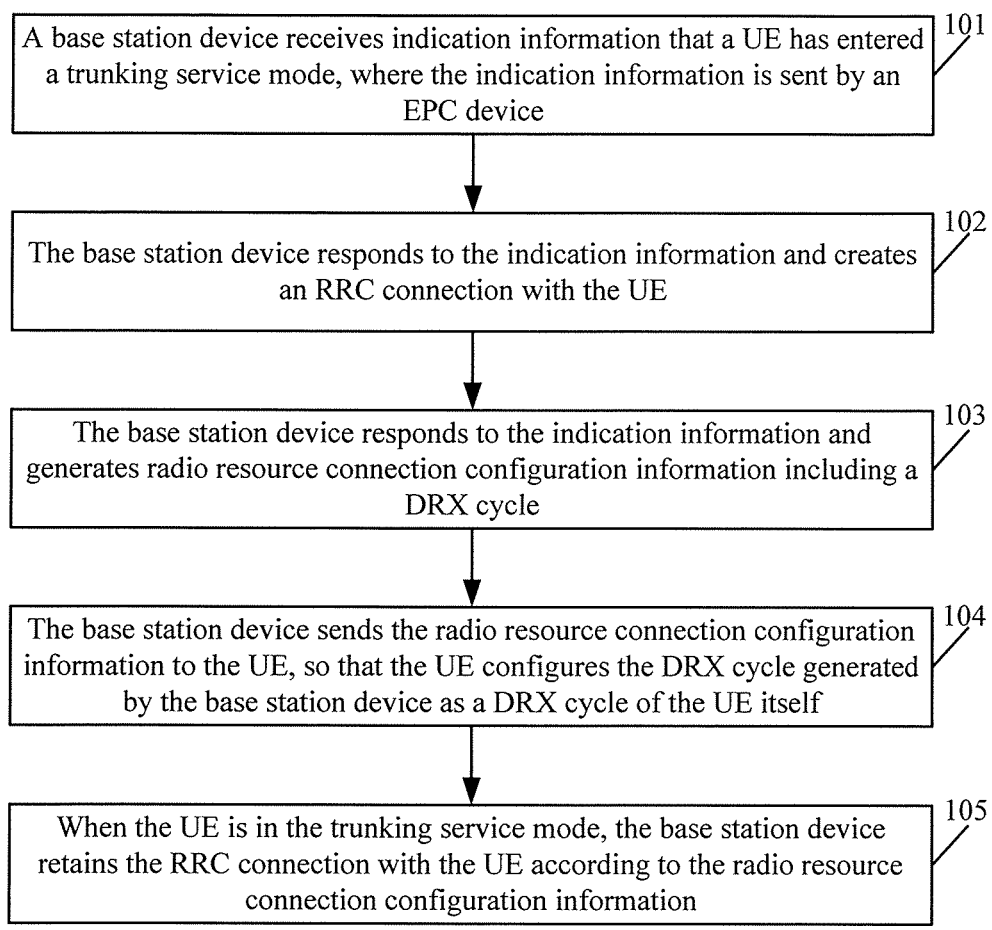
FIG. 1 is a flowchart of a method for quickly establishing a trunking service according to Embodiment 1 of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Technologies described in this specification may be applied to various communications systems, for example, current 2G and 3G communications systems and a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a General Packet Radio Service (GPRS) system, an LTE network system, and other communications systems.

In this specification, various aspects are described particularly with reference to a UE and/or a base station device and/or an evolved packet core network (EPC) device and/or a PoC server.

The UE may be a wireless terminal. The wireless terminal may refer to a device that provides a user with voice and/or data connectivity, a handheld device with a radio connection function, or another processing device connected to a radio modem. The wireless terminal may communicate with one or more core networks over a radio access network (such as RAN). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges language and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be called a system, a subscriber unit, a subscriber station, a mobile station, a mobile terminal, a remote station, an access point, a remote terminal, an access terminal, a user terminal, a user agent, a user device, or a UE.

The base station device (for example, an access point) may refer to a device that communicates with a wireless terminal by using one or more sectors over an air interface on an access network. The base station device may be configured to mutually convert a received over-the-air frame and an IP packet and serve as a router between the wireless terminal and a rest portion of the access network, where the rest portion of the access network may include an Internet Protocol (IP) network. The base station device may also coordinate attribute management of the air interface. For example, the base station device may be a base transceiver station (BTS, Base Transceiver Station) in GSM or CDMA, may also be a NodeB (NodeB) in WCDMA, and may further be an evolved NodeB (NodeB, eNB, or e-NodeB, evolved Node B) in LTE, which is not limited in the embodiments of the present invention.

The EPC device can provide broadband access anytime and anywhere, and provide a variety of applications, so as to better meet users' requirements. This is common knowledge well known by a person of ordinary skill in the art, and is not repeatedly described in the embodiments of the present invention.

In addition, the term "and/or" in this specification describes only an association relationship for describing associated objects and represents that three relationships may exist. For example, A and/or B may represent the following three cases: A exists alone, both A and B exist, and B exists alone. In addition, the symbol "/" in this specification generally indicates an "or" relationship between the associated objects.

The embodiments of the present invention provide a method for quickly establishing a trunking service and a related device and system, thereby effectively reducing a delay for establishing a trunking service, and ensuring quick establishment of the trunking service. The following gives detailed description.

For ease of subsequent description, in the embodiments of the present invention, a service mode of a UE is divided into a common service mode and a trunking service mode. An LTE network system is used as an example. In a common service mode, a UE can perform a common LTE service; and in the trunking service mode, the UE can initiate or receive a trunking service and can also respond to a common LTE service.

Embodiment 1

As shown in FIG. 1, FIG. 1 is a flowchart of a method for quickly establishing a trunking service according to Embodiment 1 of the present invention. The method for quickly establishing a trunking service shown in FIG. 1 is described from a perspective of a base station device (for example, an eNB). As shown in FIG. 1, the method for quickly establishing a trunking service may include the following steps:

101. A base station device receives indication information that a UE has entered a trunking service mode, where the indication information is sent by an EPC device.

As a possible implementation manner, the base station device may receive a bearer establishment request or a context modification request sent by the EPC device, where the request carries a quality of service class identifier (QCI) parameter of a trunking service bearer, and the QCI parameter of the trunking service bearer is used to instruct the UE to enter the trunking service mode.

As another possible implementation manner, the base station device may also receive a bearer establishment request or a UE context modification request sent by the EPC device, where the request carries a trunking service identifier, and the trunking service identifier is used to instruct the UE to enter the trunking service mode.

102. The base station device responds to the indication information and creates an RRC connection with the UE.

As another possible implementation manner, the base station device may send an RRC connection reconfiguration request to the UE and receive an RRC connection reconfiguration completion response returned by the UE, so as to implement the RRC connection with the UE.

103. The base station device responds to the indication information and generates radio resource connection configuration information including a DRX cycle.

As a possible implementation manner, the base station device may respond to the indication information and generate the radio resource connection configuration information including a first DRX cycle and a second DRX cycle, where the first DRX cycle is smaller than the second DRX cycle.

104. The base station device sends the radio resource connection configuration information to the UE, so that the UE configures the DRX cycle generated by the base station device as a DRX cycle of the UE itself.

For example, when the DRX cycle generated by the base station device includes the first DRX cycle and the second DRX cycle, where the first DRX cycle is smaller than the second DRX cycle, the UE may receive the radio resource connection configuration information that is sent by the base station device and includes the first DRX cycle and the second DRX cycle, and configure the first DRX cycle or the second DRX cycle as the DRX cycle of the UE itself.

When the UE is in the trunking service mode, the UE may automatically close or close, according to an instruction of the base station device, a discontinuous reception short cycle timer (drxShortCycleTimer), and use the first DRX cycle, so that power consumption of the UE can be reduced; and when the UE exits the trunking service mode (that is, the UE enters a common service mode), the UE may automatically activate or activate, according to an instruction of the base station device, the discontinuous reception short cycle timer (drxShortCycleTimer), and use the second DRX cycle after the drxShortCycleTimer expires, so that the UE returns to the common service mode.

In this embodiment of the present invention, the first DRX cycle is smaller than the second DRX cycle. Therefore, subsequently, in this embodiment of the present invention, the first DRX cycle is called a short DRX cycle, and the second DRX cycle is called a long DRX cycle. The UE is configured with both a short DRX cycle and a long DRX cycle, and the UE first uses the short DRX in the trunking service mode. Therefore, closing the drxShortCycleTimer can prevent the long DRX from being used due to expiration of the drxShortCycleTimer, so that power consumption of the UE in the trunking service mode can be reduced. After the UE exits the trunking service mode, the drxShortCycleTimer can be activated, and the long DRX is used when the drxShortCycleTimer expires, so that the UE returns to the common service mode.

105. When the UE is in the trunking service mode, the base station device retains the RRC connection with the UE according to the radio resource connection configuration information.

As a possible implementation manner, in the method for quickly establishing a trunking service shown in FIG. 1, the base station device may send a discontinuous reception command of entering the trunking service mode (MAC Trunking DRX Command) to the UE, where the command is used to: when the UE is in the trunking service mode, instruct the UE to use the first DRX cycle and close the drxShortCycleTimer.

In the method for quickly establishing a trunking service shown in FIG. 1, a base station device can continuously retain an RRC connection with a UE that is in a trunking service mode. In this way, when a new service arrives, service transmission can be directly performed, and the UE can perform service transmission without the need of transferring from an RRC_IDLE state to an RRC_CONNECTED state, so that a delay for establishing a trunking service can be reduced significantly and quick establishment of a trunking service is ensured.

Embodiment 2

Figure 2:
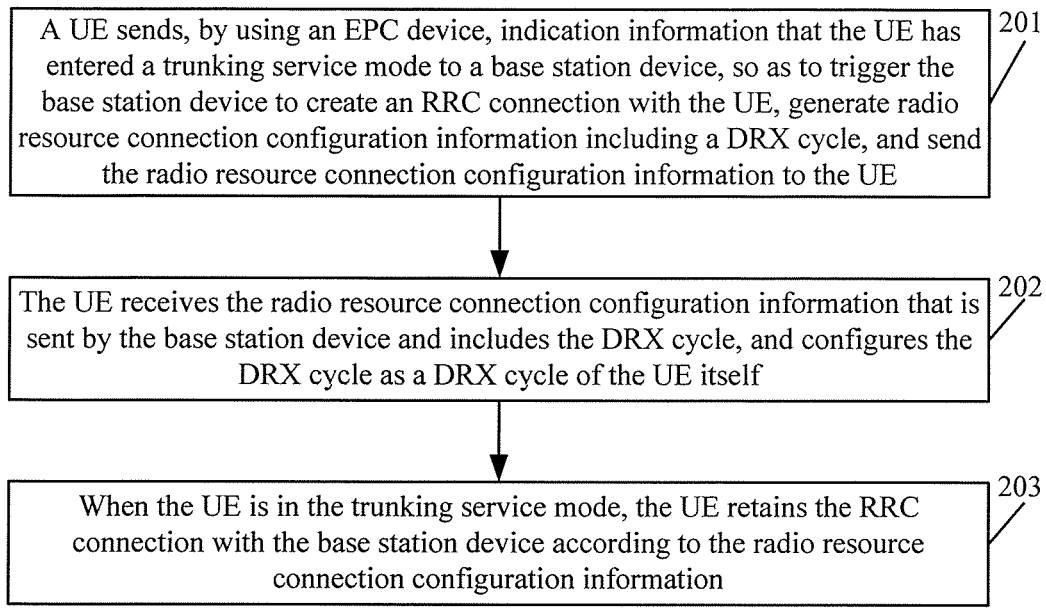
FIG. 2 is a flowchart of a method for quickly establishing a trunking service according to Embodiment 2 of the present invention.

As shown in FIG. 2, FIG. 2 is a flowchart of a method for quickly establishing a trunking service according to Embodiment 2 of the present invention. The method for quickly establishing a trunking service shown in FIG. 2 is described from a perspective of a UE. As shown in FIG. 2, the method for quickly establishing a trunking service may include the following steps:

201. A UE sends, by using an EPC device, indication information that the UE has entered a trunking service mode to a base station device, so as to trigger the base station device to create an RRC connection with the UE, generate radio resource connection configuration information including a DRX cycle, and send the radio resource connection configuration information to the UE.

As an optional implementation manner, the UE may send a bearer establishment request or a context modification request to the base station device by using the EPC device, where the request carries a QCI parameter of a trunking service bearer, and the QCI parameter of the trunking service bearer is used to instruct the UE to enter the trunking service mode.

As another optional implementation manner, the UE may send a bearer establishment request or a context modification request to the base station device by using the EPC device, where the request carries a trunking service identifier, and the trunking service identifier is used to instruct the UE to enter the trunking service mode.

202. The UE receives the radio resource connection configuration information that is sent by the base station device and includes the DRX cycle, and configures the DRX cycle as a DRX cycle of the UE itself.

For example, the UE may receive the radio resource connection configuration information that is sent by the base station device and includes a first DRX cycle and a second DRX cycle, where the first DRX cycle is smaller than the second DRX cycle. The UE may configure the first DRX cycle or the second DRX cycle as the DRX cycle of the UE itself.

203. When the UE is in the trunking service mode, the UE retains the RRC connection with the base station device according to the radio resource connection configuration information.

In this embodiment of the present invention, when the UE is in the trunking service mode, the UE may automatically close or close, according to an instruction of the base station device, a discontinuous reception short cycle timer (drxShortCycleTimer), and use the first DRX cycle, so that power consumption of the UE can be reduced; and when the UE exits the trunking service mode (that the UE enters a common service mode), the UE may automatically activate or activate, according to an instruction of the base station device, the discontinuous reception short cycle timer (drxShortCycleTimer), and use the second DRX cycle after the drxShortCycleTimer expires, so that UE returns to the common service mode.

In the method for quickly establishing a trunking service shown in FIG. 2, a UE can continuously retain an RRC connection with a base station device when the UE is in a trunking service mode. In this way, when a new service arrives, service transmission can be directly performed, and the UE can perform service transmission without the need of transferring from an RRC_IDLE state to an RRC_CONNECTED state, so that a delay for establishing a trunking service can be reduced significantly and quick establishment of a trunking service is ensured.

Embodiment 3

Figure 3:
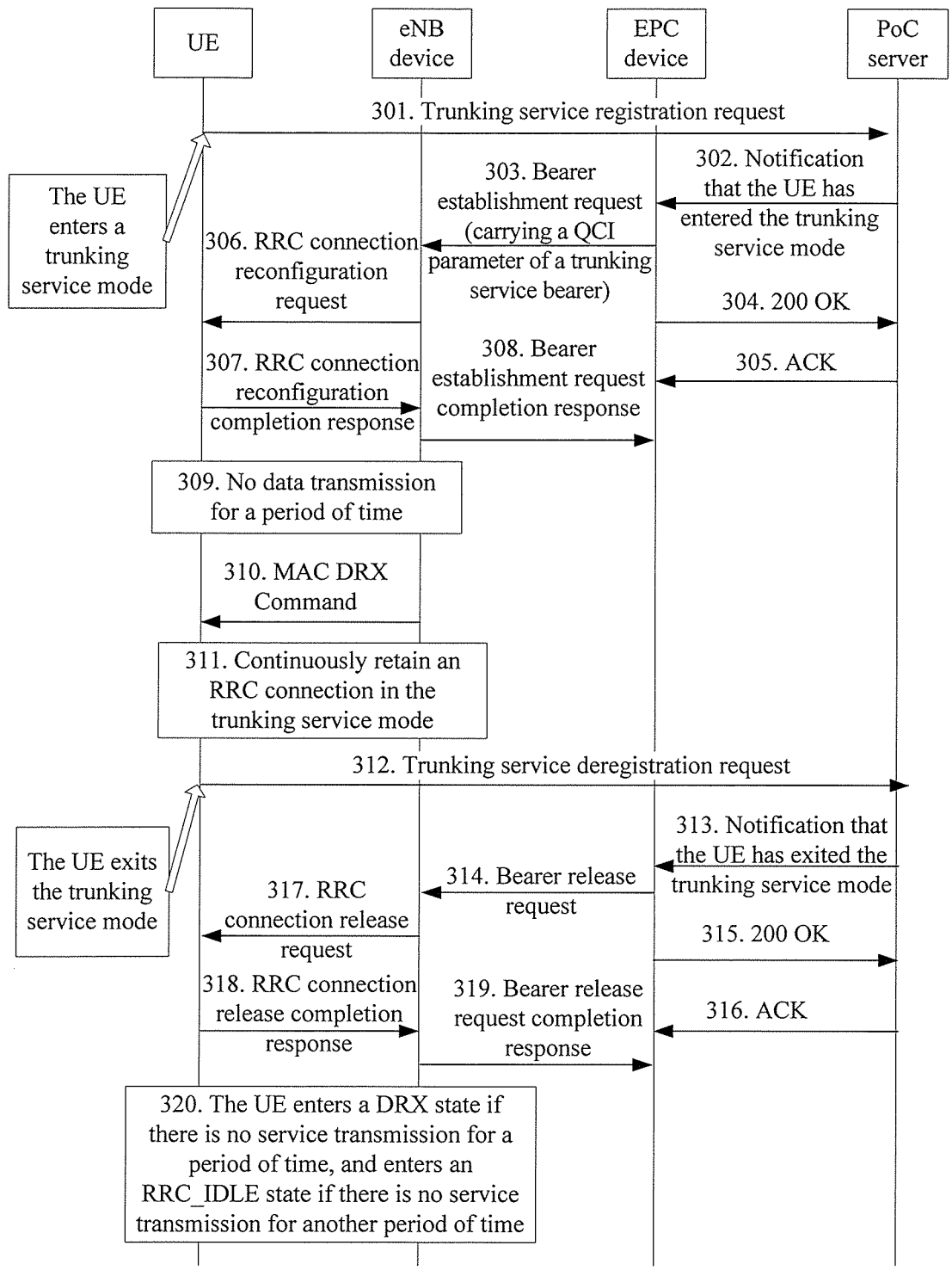
FIG. 3 is a flowchart of a method for quickly establishing a trunking service according to Embodiment 3 of the present invention.

As shown in FIG. 3, FIG. 3 is a flowchart of a method for quickly establishing a trunking service according to Embodiment 3 of the present invention. The method for quickly establishing a trunking service shown in FIG. 3 is described from perspectives of a UE, a base station device (eNB), an EPC device, and a PoC server. As shown in FIG. 3, the method for quickly establishing a trunking service may include the following steps:

301. After entering a trunking service mode, a UE sends a trunking service registration request to a PoC server, so as to enable a trunking service.

302. The PoC server sends a notification that the UE has entered the trunking service mode to an EPC.

303. The EPC sends a bearer establishment request to an eNB, where the bearer establishment request carries a QCI parameter of a trunking service bearer, and the QCI parameter of the trunking service bearer is used to instruct the UE to enter the trunking service mode.

The foregoing steps 301 to 303 achieve an objective that the UE sends, by using the EPC device, indication information that the UE has entered the trunking service mode to the eNB.

Referring to Table 1, Table 1 lists a correspondence between a QCI parameter and a service type. After receiving the bearer establishment request sent by the EPC, the eNB can identify, according to the QCI parameter (QCI=10/11) of the trunking service bearer, that the UE is in the trunking service mode.

TABLE 1

| QCI | Resource Type | Priority | Packet Delay Budget (ms) | Packet Loss Rate | Service Type |
|---|---|---|---|---|---|
| 1 | GBR | 4 | 100 | 10-2 | Conversational voice |
| 2 | GBR | 6 | 150 | 10-3 | Conversational video |
| 3 | GBR | 7 | 300 | 10-6 | Non-conversational video (buffered stream) |
| 4 | GBR | 5 | 50 | 10-3 | Real-time game |
| 5 | Non-GBR | 1 | 100 | 10-6 | IMS signaling |
| 6 | Non-GBR | 9 | 100 | 10-3 | Voice, video (live media), and interactive game |
| 7 | Non-GBR | 8 | 300 | 10-6 | Video (buffered stream) |

TABLE 1-continued

| QCI | Resource Type | Priority | Packet Delay Budget (ms) | Packet Loss Rate | Service Type |
|---|---|---|---|---|---|
| 8 | Non-GBR | 10 | 300 | 10-6 | TCP-based chat, and FTP and P2P file sharing |
| 9 | GBR | 11 | 300 | 10-6 | |
| 10 | GBR | 2 | 100 | 10-3 | Trunking voice service |
| 11 | GBR | 3 | 150 | 10-3 | Trunking video session |

304. The EPC returns, to the PoC server, a response 200 OK to the notification that the UE has entered the trunking service mode.

305. The EPC receives an acknowledgement message ACK sent by the PoC server.

306. The eNB sends an RRC connection reconfiguration request to the UE.

307. The eNB receives an RRC connection reconfiguration completion response returned by the UE, so as to implement an RRC connection between the eNB and the UE.

308. The eNB returns a bearer establishment completion response to the EPC.

309-310. If there is no service transmission for a period of time, the eNB sends a command (MAC DRX Command) of entering a discontinuous reception state to the UE, so as to command the UE to enter a DRX state.

311. When the UE is in the trunking service mode, the eNB continuously retains the RRC connection with the UE regardless of whether there is service transmission, and does not release radio resources.

312. After exiting the trunking service mode, the UE sends a trunking service deregistration request to the PoC server, so as to close the trunking service.

In this embodiment of the present invention, when the UE is inactive for a long time, step 312 may not be performed, and the PoC server automatically initiates step 313.

313. The PoC server sends a notification that the UE has exited the trunking service mode to the EPC.

314. The EPC sends a bearer release request to the eNB.

315. The EPC returns, to the PoC server, a response 200 OK to the notification that the UE has exited the trunking service mode.

316. The EPC receives an acknowledgement message ACK sent by the PoC server.

317. The eNB sends an RRC connection release request to the UE.

318. The eNB receives an RRC connection release completion response returned by the UE, and releases the RRC connection between the eNB and the UE.

319. The eNB returns a bearer release request completion response to the EPC.

320. The UE enters a common service mode. If there is no service transmission for a period of time, the UE enters the DRX state. If there is no service transmission for another period of time, the UE enters an RRC_IDLE state.

In the method for quickly establishing a trunking service shown in FIG. 3, an eNB can continuously retain an RRC connection with a UE that is in a trunking service mode. In this way, when a new service arrives, service transmission can be directly performed, and the UE can perform service transmission without the need of transferring from an RRC_IDLE state to an RRC_CONNECTED state, so that a delay for establishing a trunking service can be reduced significantly and quick establishment of a trunking service is ensured.

Embodiment 4

Figure 4:
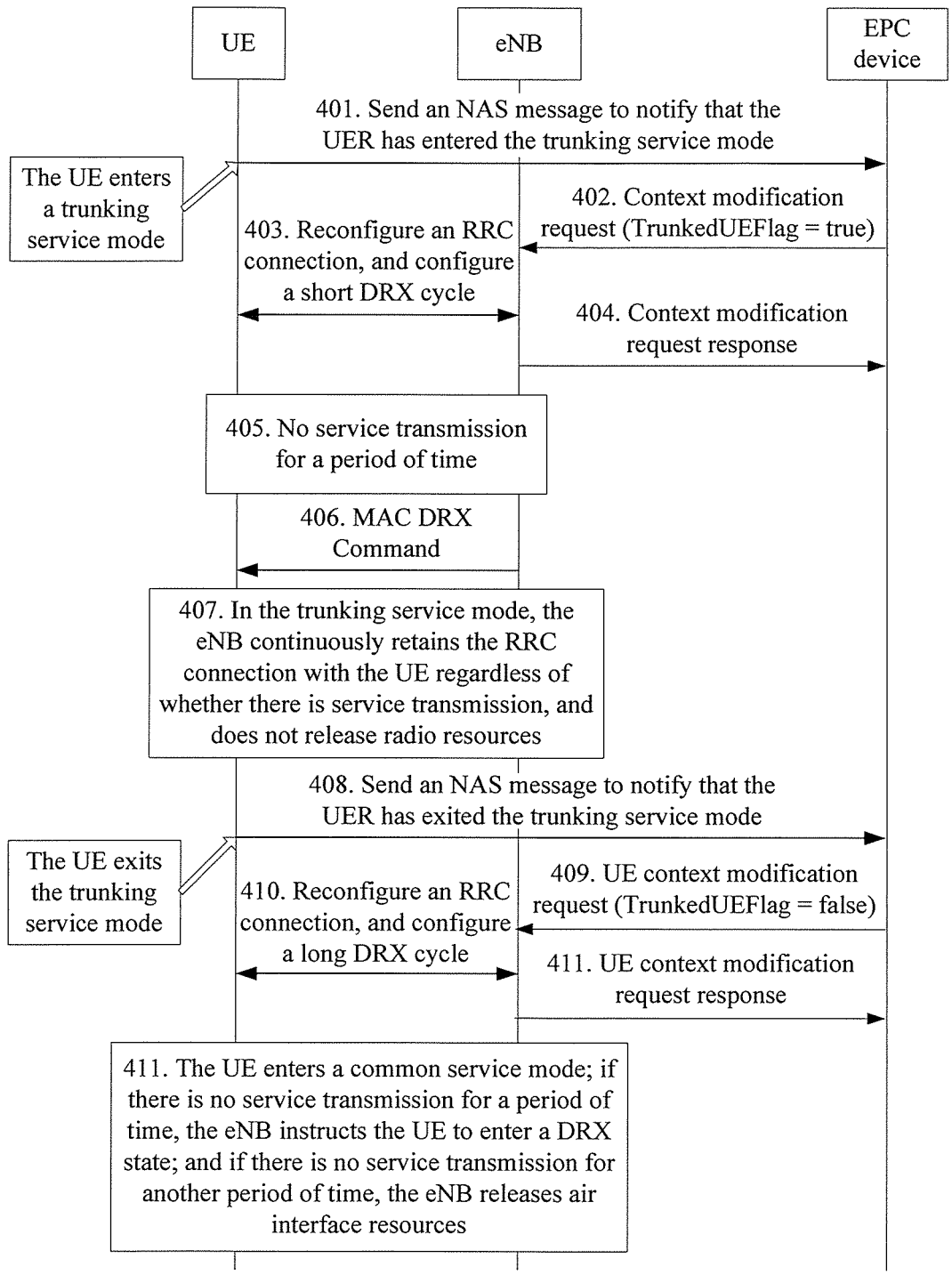
FIG. 4 is a flowchart of a method for quickly establishing a trunking service according to Embodiment 4 of the present invention.

As shown in FIG. 4, FIG. 4 is a flowchart of a method for quickly establishing a trunking service according to Embodiment 4 of the present invention. The method for quickly establishing a trunking service shown in FIG. 4 is described from perspectives of a UE, a base station device (eNB), an EPC device, and a PoC server. Different from the method shown in FIG. 3, in the method shown in FIG. 4, an EPC may modify a UE context by using an S1 interface to carry a trunking service identifier, where the trunking service identifier is used to instruct the UE to enter a trunking service mode. As shown in FIG. 4, the method for quickly establishing a trunking service may include the following steps:

401. After entering a trunking service mode, a UE sends an NAS message to an EPC, where the NAS message is used to notify the EPC that the UE has entered the trunking service mode.

402. The EPC sends a context modification request to an eNB by using an S1 interface, where the context modification request carries an extended trunking service identifier TrunkedUEFlag=true that is used to instruct the UE to enter the trunking service mode.

The foregoing steps 401 to 402 achieve an objective that the UE sends, by using the EPC device, indication information that the UE has entered the trunking service mode to the eNB.

403. The eNB creates an RRC connection with the UE and configures a short DRX cycle for the UE in the trunking service mode.

404. The eNB returns a context modification request response to the EPC.

405-406. If there is no service transmission for a period of time, the eNB sends a command MAC DRX Command to the UE, so as to command the UE to enter a DRX state.

407. When the UE is in the trunking service mode, the eNB continuously retains the RRC connection with the UE regardless of whether there is service transmission, and does not release radio resources.

408. After exiting the trunking service mode, the UE sends an NAS message to the EPC, where the NAS message is used to notify the EPC that the UE has exited the trunking service mode.

409. The EPC sends a UE context modification request to the eNB by using the S1 interface, where the UE context modification request carries a UE exiting trunking service identifier TrunkedUEFlag=false that is used to instruct the UE to exit the trunking service mode.

410. The eNB releases the RRC connection with the UE, and configures a long DRX cycle for the UE in a common service mode.

411. The eNB returns a UE context modification request response to the EPC, and the UE enters the common service mode. If there is no service transmission for a period of time, the eNB commands the UE to enter the DRX state. If there is no service transmission for another period of time, the eNB releases air interface resources.

In the method for quickly establishing a trunking service shown in FIG. 4, a UE in a trunking service mode can continuously retain an RRC connection with an eNB. In this way, when a new service arrives, service transmission can be directly performed, and the UE can perform service transmission without the need of transferring from an RRC_IDLE state to an RRC_CONNECTED state, so that a delay for establishing a trunking service can be reduced significantly and quick establishment of a trunking service is ensured.

Embodiment 5

Figure 5:
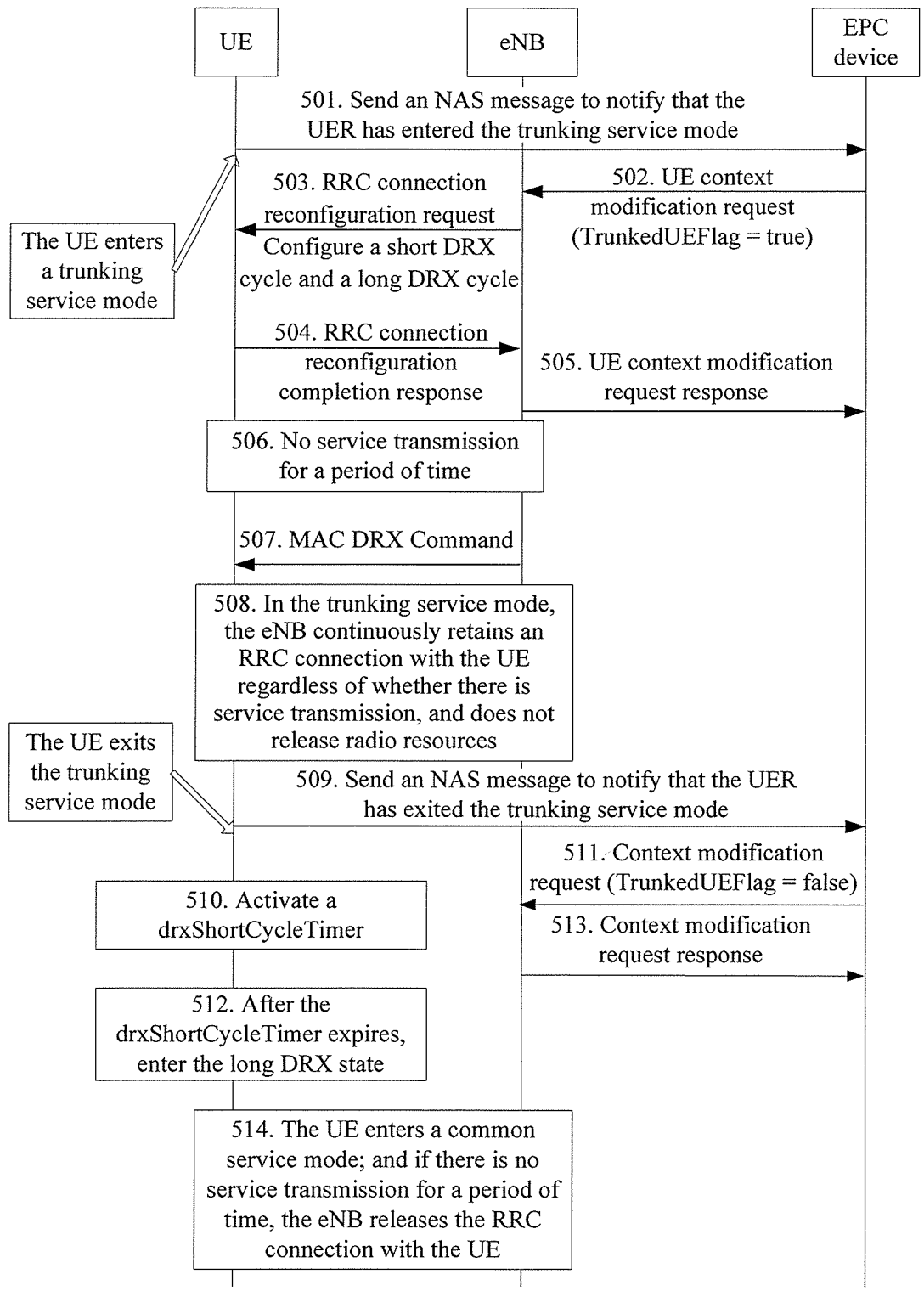
FIG. 5 is a flowchart of a method for quickly establishing a trunking service according to Embodiment 5 of the present invention.

As shown in FIG. 5, FIG. 5 is a flowchart of a method for quickly establishing a trunking service according to Embodiment 5 of the present invention. The method for quickly establishing a trunking service shown in FIG. 5 is described from perspectives of a UE, a base station device (eNB), an EPC device, and a PoC server. Different from the method shown in FIG. 4, in the method shown in FIG. 5, an eNB can configure, for a UE, both a short DRX cycle used in a trunking service mode and a long DRX cycle used in a common service mode, so that in the trunking service mode, the UE works in a short DRX cycle state all the time, and in the common service mode, the UE can first work in the short DRX cycle state and then switch to a long DRX cycle state. As shown in FIG. 5, the method for quickly establishing a trunking service may include the following steps:

501. After entering a trunking service mode, a UE sends an NAS message to an EPC, where the NAS message is used to notify the EPC that the UE has entered the trunking service mode.

502. The EPC sends a context modification request to an eNB by using an S1 interface, where the context modification request carries an extended trunking service identifier TrunkedUEFlag=true that is used to instruct the UE to enter the trunking service mode.

503-504. The eNB creates an RRC connection with the UE and configures, for the UE, a short DRX cycle used in the trunking service mode and a long DRX cycle used in a common service mode.

505. The eNB returns a context modification request response to the EPC.

506-507. If there is no service transmission for a period of time, the eNB sends a command MAC DRX Command to the UE, so as to command the UE to enter a DRX state. Because the UE is configured with both the short DRX cycle and the long DRX cycle, the UE first uses the short DRX cycle and then uses the long DRX cycle after a drxShortCycleTimer expires. In the embodiment, the UE needs to automatically close the drxShortCycleTimer, so that the UE cannot automatically transfer from a short DRX state to a long DRX state in the trunking service mode.

508. When the UE is in the trunking service mode, the eNB continuously retains the RRC connection with the UE regardless of whether there is service transmission, and does not release radio resources.

509. After exiting the trunking service mode, the UE sends an NAS message to the EPC, where the NAS message is used to notify the EPC that the UE has exited the trunking service mode (that is, the UE has entered the common service mode).

510. The UE activates the drxShortCycleTimer.

511. The EPC sends a context modification request to the eNB by using the S1 interface, where the context modification request carries a UE exiting trunking service identifier TrunkedUEFlag=false that is used to instruct the UE to exit the trunking service mode (that is, the UE has entered the common service mode).

512. The UE enters the long DRX state when the drxShortCycleTimer expires.

513. The eNB returns a context modification request response to the EPC.

514. The UE enters the common service mode. If there is no service transmission for a period of time, the eNB releases the RRC connection with the UE.

In the method for quickly establishing a trunking service shown in FIG. 5, a UE in a trunking service mode continuously retains an RRC connection with an eNB. In this way, when a new service arrives, service transmission can be directly performed, and the UE can perform service transmission without the need of transferring from an RRC_IDLE state to an RRC_CONNECTED state, so that a delay for establishing a trunking service can be reduced significantly and quick establishment of a trunking service is ensured.

Embodiment 6

Figure 6:
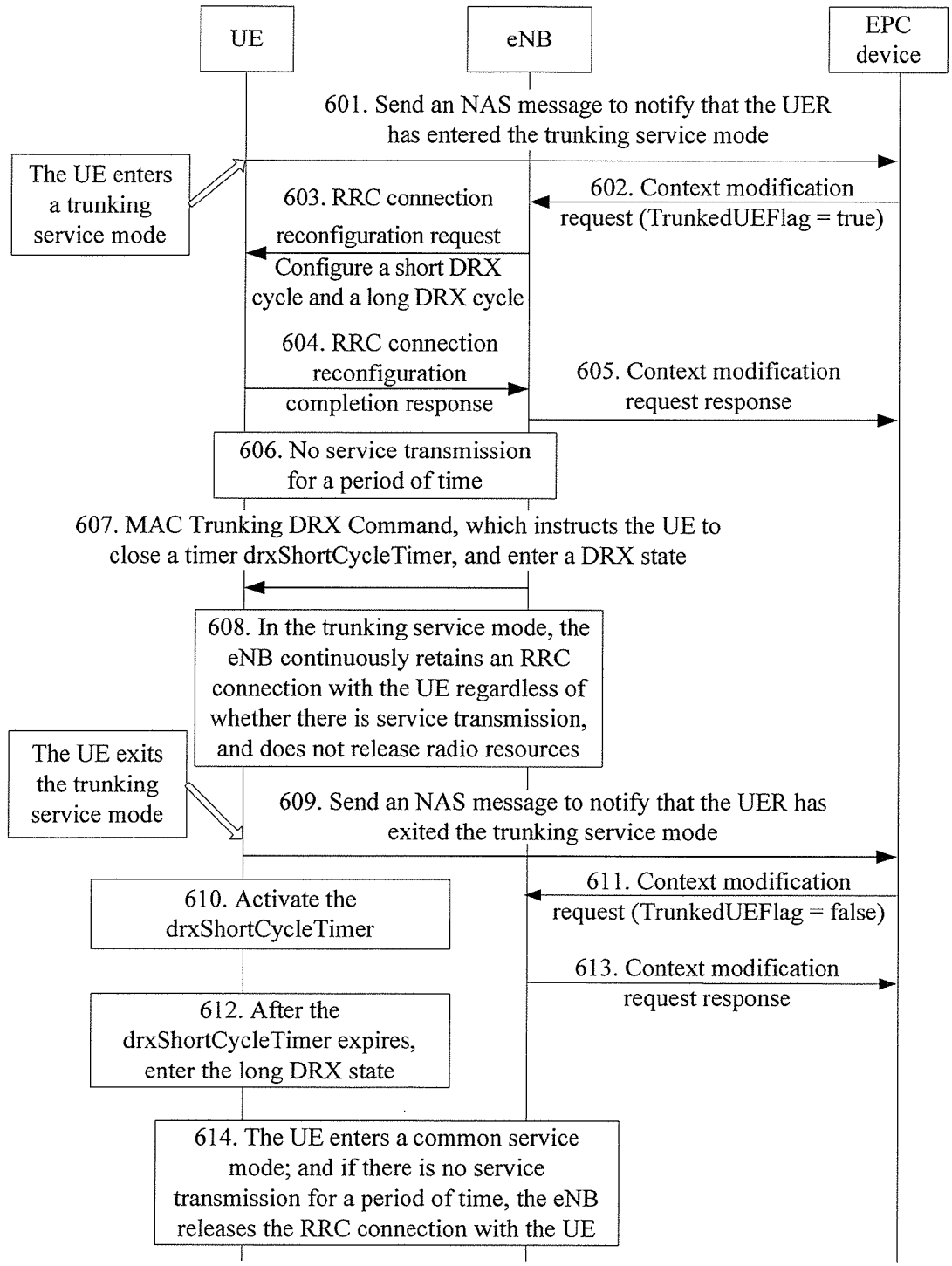
FIG. 6 is a flowchart of a method for quickly establishing a trunking service according to Embodiment 6 of the present invention.

As shown in FIG. 6, FIG. 6 is a flowchart of a method for quickly establishing a trunking service according to Embodiment 6 of the present invention. The method for quickly establishing a trunking service shown in FIG. 6 is described from perspectives of a UE, a base station device (eNB), an EPC device, and a PoC server. Different from the methods shown in FIG. 4 and FIG. 5, in the method shown in FIG. 6, an eNB extends a discontinuous reception command of entering a trunking service mode (MAC Trunking DRX Command), which is used to: when a UE is in a trunking service mode, instruct the UE to use a short DRX and close a drxShortCycleTimer, thereby preventing the UE from using a long DRX due to expiration of the drxShortCycleTimer. As shown in FIG. 6, the method for quickly establishing a trunking service may include the following steps:

Step 601 to step 605 are the same as step 501 to step 505, respectively, which are not repeatedly described in this embodiment of the present invention.

606-607. If there is no service transmission for a period of time, the eNB sends a command MAC Trunking DRX Command to the UE, so as to instruct, when the UE is in the trunking service mode, the UE to use the short DRX, close a drxShortCycleTimer, and enter a DRX state. Because the UE is configured with both the short DRX cycle and the long DRX cycle, the UE first uses the short DRX and then uses the long DRX after the drxShortCycleTimer expires. In this embodiment, the UE needs to close the drxShortCycleTimer according to the command of the eNB, so that the UE cannot automatically transfer from a short DRX state to a long DRX state in the trunking service mode.

Step 608 to step 614 are the same as step 508 to step 514, respectively, which are not repeatedly described in this embodiment of the present invention.

In the method for quickly establishing a trunking service shown in FIG. 6, a UE in a trunking service mode continuously retains an RRC connection with an eNB. In this way, when a new service arrives, service transmission can be directly performed, and the UE can perform service transmission without the need of transferring from an RRC_IDLE state to an RRC_CONNECTED state, so that a delay for establishing a trunking service can be reduced significantly, quick establishment of a trunking service is ensured, an impact on a standard is minor, and system compatibility is good.

Embodiment 7

Figure 7:
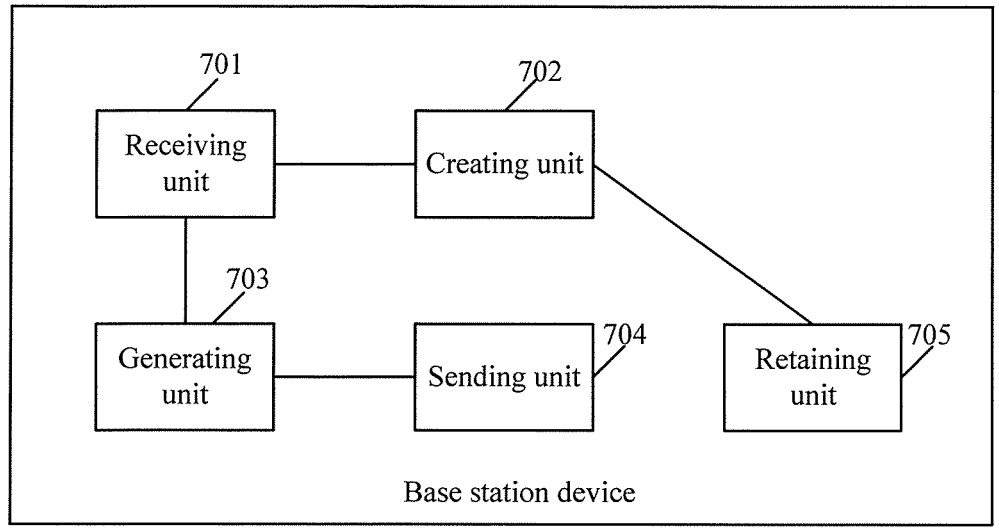
FIG. 7 is a structural diagram of a base station device according to Embodiment 7 of the present invention.

As shown in FIG. 7, FIG. 7 is a structural diagram of a base station device according to Embodiment 7 of the present invention. As shown in FIG. 7, the base station device may include:

a receiving unit 701, configured to receive indication information that a UE has entered a trunking service mode, where the indication information is sent by an EPC device;

a creating unit 702, configured to respond to the indication information and create an RRC connection between the base station device and the UE;

a generating unit 703, configured to respond to the indication information and generate radio resource connection configuration information including a DRX cycle;

a sending unit 704, configured to send the radio resource connection configuration information to the UE, so that the UE configures the DRX cycle as a DRX cycle of the UE itself; and a retaining unit 705, configured to: when the UE is in the trunking service mode, retain the RRC connection with the UE according to the radio resource connection configuration information, so as to quickly establish a trunking service.

As a possible implementation manner, the receiving unit 701 is specifically configured to receive a bearer establishment request or a context modification request sent by the EPC device, where the request carries a QCI parameter of a trunking service bearer, and the QCI parameter of the trunking service bearer is used to instruct the UE to enter the trunking service mode.

As another possible implementation manner, the receiving unit 701 is specifically configured to receive a bearer establishment request or a context modification request sent by the EPC device, where the request carries a trunking service identifier, and the trunking service identifier is used to instruct the UE to enter the trunking service mode.

As a possible implementation manner, the creating unit 702 is specifically configured to respond to the indication information, send an RRC connection reconfiguration request to the UE, and receive an RRC connection reconfiguration response returned by the UE, so as to implement the RRC connection between the base station device and the UE.

As a possible implementation manner, the generating unit 703 is specifically configured to respond to the indication information and generate the radio resource connection configuration·information including a first DRX cycle and a second DRX cycle, where the first DRX cycle is smaller than the second DRX cycle. Correspondingly, the UE may configure the first DRX cycle or the second DRX cycle as the DRX cycle of the UE itself. When the UE is in the trunking service mode, the UE may automatically close or close, according to an instruction of the base station device, a drxShortCycleTimer, and use the first DRX cycle, thereby reducing power consumption of the UE; and when the UE exits the trunking service mode, the UE may automatically activate or activate, according to an instruction of the base station device, the drxShortCycleTimer, and use the second DRX cycle after the drxShortCycleTimer expires, so that a common service mode of the UE can be restored.

As a possible implementation manner, in the base station device shown in FIG. 7, the sending unit 704 may be further configured to send a discontinuous reception command of entering the trunking service mode (MAC Trunking DRX Command) to the UE, where the command is used to: when the UE is in the trunking service mode, instruct the UE to use the first DRX cycle and close the drxShortCycleTimer.

The base station device shown in FIG. 7 can continuously retain an RRC connection with a UE that is in a trunking service mode. In this way, when a new service arrives, service transmission can be directly performed, and the UE can perform service transmission without the need of transferring from an RRC_IDLE state to an RRC_CONNECTED state, so that a delay for establishing a trunking service can be reduced significantly, quick establishment of a trunking service is ensured, an impact on a standard is minor, and system compatibility is good.

Embodiment 8

Figure 8:
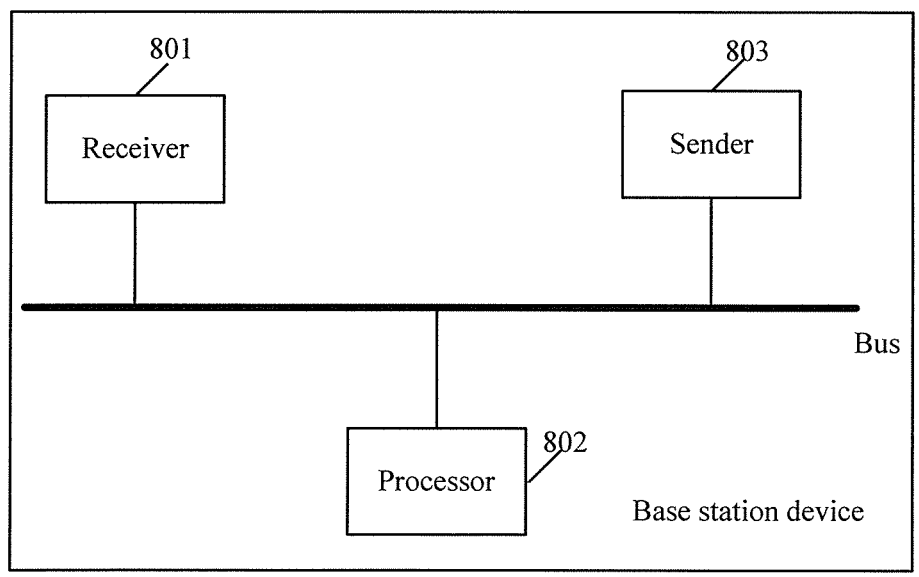
FIG. 8 is a structural diagram of a base station device according to Embodiment 8 of the present invention.

As shown in FIG. 8, FIG. 8 is a structural diagram of a base station device according to Embodiment 8 of the present invention. As shown in FIG. 8, the base station device may include a receiver 801, a processor 802, and a sender 803. In some embodiments of the present invention, the receiver 801, the processor 802, and the sender 803 may be connected by using a bus or in another manner, and in FIG. 8, connecting them by using a bus is used as an example, where:

the receiver 801 is configured to receive indication information that a UE has entered a trunking service mode, where the indication information is sent by an EPC device;

the processor 802 is configured to respond to the indication information, create an RRC connection between the base station device and the UE, and generate radio resource connection configuration information including a DRX cycle;

the sender 803 is configured to send the radio resource connection configuration information to the UE, so that the UE configures the DRX cycle as a DRX cycle of the UE itself; and the processor 802 is further configured to: when the UE is in the trunking service mode, retain the RRC connection with the UE according to the radio resource connection configuration information.

As a possible implementation manner, the receiver 801 is specifically configured to receive a bearer establishment request or a context modification request sent by the EPC device, where the request carries a QCI parameter of a trunking service bearer, and the QCI parameter of the trunking service bearer is used to instruct the UE to enter the trunking service mode.

As another possible implementation manner, the receiver 801 is specifically configured to receive a bearer establishment request or a context modification request sent by the EPC device, where the request carries a trunking service identifier, and the trunking service identifier is used to instruct the UE to enter the trunking service mode.

As a possible implementation manner, that the processor 802 responds to the indication information and creates an RRC connection between the base station device and the UE may specifically be:

the processor 802 responds to the indication information, sends an RRC connection reconfiguration request to the UE, and receives an RRC connection reconfiguration response returned by the UE, so as to implement the RRC connection between the base station device and the UE.

As a possible implementation manner, that the processor 802 responds to the indication information and generates radio resource connection configuration information including a DRX cycle may specifically be:

the processor 802 responds to the indication information and generates the radio resource connection configuration information including a first DRX cycle and a second DRX cycle, where the first DRX cycle is smaller than the second DRX cycle. Correspondingly, the UE may configure the first DRX cycle or the second DRX cycle as the DRX cycle of the UE itself. When the UE is in the trunking service mode, the UE may automatically close or close, according to an instruction of the base station device, a drxShortCycleTimer, and use the first DRX cycle, thereby reducing power consumption of the UE; and when the UE exits the trunking service mode, the UE may automatically activate or activate, according to an instruction of the base station device, the drxShortCycleTimer, and use the second DRX cycle after the drxShortCycleTimer expires, so that a common service mode of the UE can be restored.

As a possible implementation manner, the sender 803 is further configured to send a discontinuous reception command of entering the trunking service mode (MAC Trunking DRX Command) to the UE, where the command is used to: when the UE is in the trunking service mode, instruct the UE to use the first DRX cycle and close the drxShortCycleTimer.

The base station device shown in FIG. 8 can continuously retain an RRC connection with a UE that is in a trunking service mode. In this way, when a new service arrives, service transmission can be directly performed, and the UE can perform service transmission without the need of transferring from an RRC_IDLE state to an RRC_CONNECTED state, so that a delay for establishing a trunking service can be reduced significantly, quick establishment of a trunking service is ensured, an impact on a standard is minor, and system compatibility is good.

Embodiment 9

Figure 9:
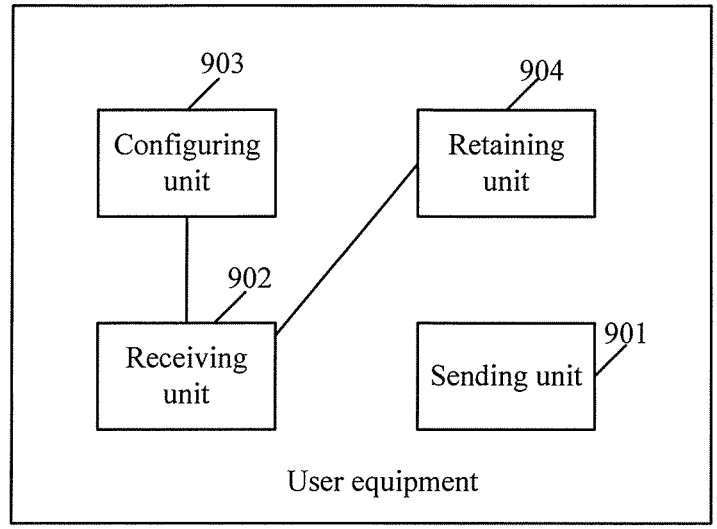
FIG. 9 is a structural diagram of a user equipment according to Embodiment 9 of the present invention.

As shown in FIG. 9, FIG. 9 is a structural diagram of a UE according to Embodiment 9 of the present invention. As shown in FIG. 9, the UE may include:

a sending unit 901, configured to send, by using an EPC device, indication information that the UE has entered a trunking service mode to a base station device, so as to trigger the base station device to create an RRC connection with the UE, generate radio resource connection configuration information including a DRX cycle, and send the radio resource connection configuration information to the UE;

a receiving unit 902, configured to receive the radio resource connection configuration information that is sent by the base station device and includes the DRX cycle;

a configuring unit 903, configured to configure the DRX cycle as a DRX cycle of the UE itself; and a retaining unit 904, configured to: when the UE is in the trunking service mode, retain the RRC connection with the base station device according to the radio resource connection configuration information.

As a possible implementation manner, the sending unit 901 is specifically configured to send a bearer establishment request or a context modification request to the base station device by using the EPC device, where the request carries a QCI parameter of a trunking service bearer, and the QCI parameter of the trunking service bearer is used to instruct the UE to enter the trunking service mode.

As another possible implementation manner, the sending unit 901 is specifically configured to send a bearer establishment request or a context modification request to the base station device by using the EPC device, where the request carries a trunking service identifier, and the trunking service identifier is used to instruct the UE to enter the trunking service mode.

As a possible implementation manner, the receiving unit 902 is specifically configured to receive the radio resource connection configuration information that is sent by the base station device and includes a first DRX cycle and a second DRX cycle, where the first DRX cycle is smaller than the second DRX cycle. Correspondingly, the configuring unit 903 is specifically configured to configure the first DRX cycle or the second DRX cycle as a DRX cycle of the UE itself.

As a possible implementation manner, the retaining unit 904 is further configured to: when the UE is in the trunking service mode, automatically close or close, according to an instruction of the base station device, a drxShortCycleTimer, and use the first DRX cycle, thereby reducing power consumption of the UE; and when the UE exits the trunking service mode, automatically activate or activate, according to an instruction of the base station device, the drxShortCycleTimer, and use the second DRX cycle after the drxShortCycleTimer expires, so that a common service mode of the UE can be restored.

In this embodiment of the present invention, the receiving unit 902 may further receive an RRC connection reconfiguration request sent by the base station device, and the sending unit 901 is further configured to send an RRC connection reconfiguration completion response to the base station device, so as to establish the RRC connection between the UE and the base station device.

The UE shown in FIG. 9 can continuously retain an RRC connection with a base station device when the UE is in a trunking service mode. In this way, when a new service arrives, service transmission can be directly performed, and the UE can perform service transmission without the need of transferring from an RRC_IDLE state to an RRC_CONNECTED state, so that a delay for establishing a trunking service can be reduced significantly, quick establishment of a trunking service is ensured, an impact on a standard is minor, and system compatibility is good.

Embodiment 10

Figure 10:
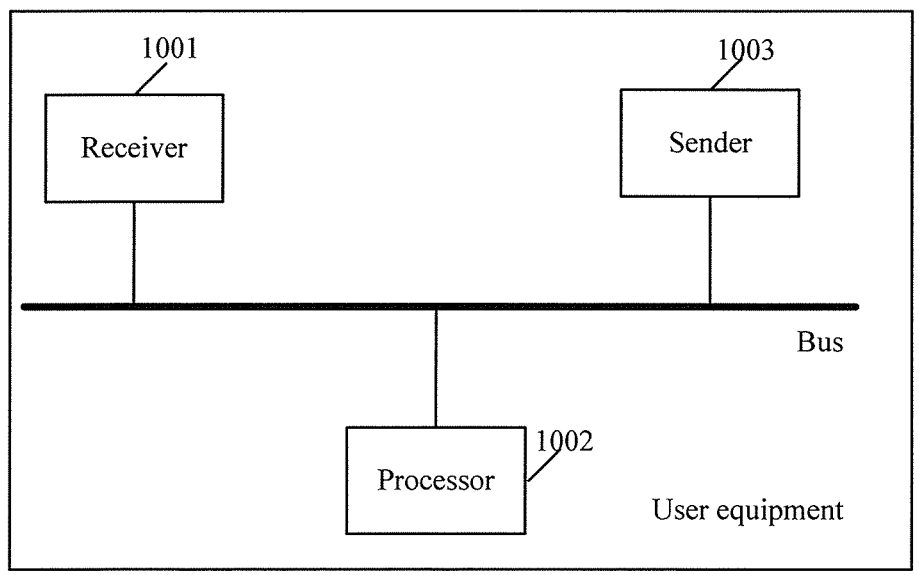
FIG. 10 is a structural diagram of a user equipment according to Embodiment 10 of the present invention.

As shown in FIG. 10, FIG. 10 is a structural diagram of a UE according to Embodiment 10 of the present invention. As shown in FIG. 10, the UE may include a receiver 1001, a processor 1002, and a sender 1003. In some embodiments of the present invention, the receiver 1001, the processor 1002, and the sender 1003 may be connected by using a bus or in another manner, and in FIG. 10, connecting them by using a bus is used as an example, where:

the sender 1003 is configured to send, by using an EPC device, indication information that the UE has entered a trunking service mode to a base station device, so as to trigger the base station device to create an RRC connection with the UE, generate radio resource connection configuration information including a DRX cycle, and send the radio resource connection configuration information to the UE;

the receiver 1001 is configured to receive the radio resource connection configuration information that is sent by the base station device and includes the DRX cycle; and the processor 1002 is configured to configure the DRX cycle as a DRX cycle of the UE itself, and when the user equipment is in the trunking service mode, retain the RRC connection with the base station device according to the radio resource connection configuration information.

As a possible implementation manner, the sender 1003 is specifically configured to send a bearer establishment request or a context modification request to the base station device by using the EPC device, where the request carries a QCI parameter of a trunking service bearer, and the QCI parameter of the trunking service bearer is used to instruct the UE to enter the trunking service mode.

As another possible implementation manner, the sender 1003 is specifically configured to send a bearer establishment request or a context modification request to the base station device by using the EPC device, where the request carries a trunking service identifier, and the trunking service identifier is used to instruct the UE to enter the trunking service mode.

As a possible implementation manner, the receiver 1001 is specifically configured to receive the radio resource connection configuration information that is sent by the base station device and includes a first DRX cycle and a second DRX cycle, where the first DRX cycle is smaller than the second DRX cycle. Correspondingly, the processor 1002 is specifically configured to configure the first DRX cycle or the second DRX cycle as the DRX cycle of the UE itself, and when the UE is in the trunking service mode, retain the RRC connection with the base station device according to the radio resource connection configuration information.

As a possible implementation manner, the processor 1002 is further configured to: when the UE is in the trunking service mode, automatically close or close, according to an instruction of the base station device, a drxShortCycleTimer, and use the first DRX cycle, thereby reducing power consumption of the UE; and when the UE exits the trunking service mode, automatically activate or activate, according to an instruction of the base station device, the drxShortCycleTimer, and use the second DRX cycle after the drxShortCycleTimer expires, so that a common service mode of the UE can be restored.

In this embodiment of the present invention, the receiver 1001 may further receive an RRC connection reconfiguration request sent by the base station device, and the sender 1003 is further configured to send an RRC connection reconfiguration completion response to the base station device, so as to establish the RRC connection between the UE and the base station device.

The UE shown in FIG. 10 can continuously retain an RRC connection with a base station device when the UE is in a trunking service mode. In this way, when a new service arrives, service transmission can be directly performed, and the UE can perform service transmission without the need of transferring from an RRC_IDLE state to an RRC_CONNECTED state, so that a delay for establishing a trunking service can be reduced significantly, quick establishment of a trunking service is ensured, an impact on a standard is minor, and system compatibility is good.

Embodiment 11

Figure 11:
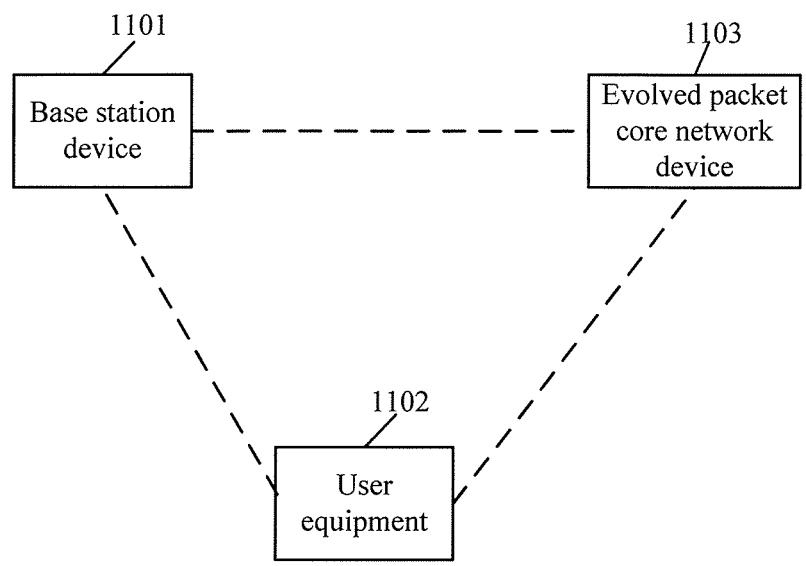
FIG. 11 is a structural diagram of a system for quickly establishing a trunking service according to Embodiment 11 of the present invention.

As shown in FIG. 11, FIG. 11 is a structural diagram of a system for quickly establishing a trunking service according to Embodiment 11 of the present invention. As shown in FIG. 11, the system may include a base station device 1101, a UE 1102, and an evolved packet core network device 1103. A structure and a function of the base station device 1101 may be the same as those of the base station device shown in FIG. 7 or FIG. 8, and a structure and a function of the UE 1102 may be the same as those of the UE shown in FIG. 9 or FIG. 10, which are not repeatedly described in this embodiment of the present invention. In FIG. 11, a dashed line indicates a wireless connection.

The evolved packet core network device 1103 is configured to send indication information that the UE 1102 has entered a trunking service mode to the base station device 1101.

As a possible implementation manner, the evolved packet core network device 1103 is specifically configured to send a bearer establishment request or a context modification request to the base station device 1101, where the request carries a QCI parameter of a trunking service bearer, and the QCI parameter of the trunking service bearer is used to instruct the UE 1102 to enter the trunking service mode.

As another possible implementation manner, the evolved packet core network device 1103 is specifically configured to send a bearer establishment request or a context modification request to the base station device 1101, where the request carries a trunking service identifier, and the trunking service identifier is used to instruct the UE 1102 to enter the trunking service mode.

In the system shown in FIG. 11, an RRC connection between a UE 1102 that is in a trunking service mode and a base station device 1101 can be continuously retained. In this way, when a new service arrives, service transmission can be directly performed, and the UE 1102 can perform service transmission without the need of transferring from an RRC_IDLE state to an RRC_CONNECTED state, so that a delay for establishing a trunking service can be reduced significantly, quick establishment of a trunking service is ensured, an impact on a standard is minor, and system compatibility is good.

It should be noted that, for brevity of description, the foregoing method embodiments are represented as a series of action combinations. However, a person skilled in the art should know that the present invention is not limited to the order of the described actions, because according to the present invention, some steps may adopt other order or occur simultaneously. A person skilled in the art should also know that the embodiments described in this specification all belong to exemplary embodiments, and the involved actions and modules are not necessarily required by the present invention.

In the foregoing embodiments, the description of each of the embodiments has an emphasis. For a part that is not described in detail in a certain embodiment, reference may be made to related descriptions in other embodiments.

A person of ordinary skill in the art may understand that all or a part of the steps of the methods in the embodiments may be implemented by a program instructing relevant hardware. The program may be stored in a computer readable storage medium. The storage medium may include a flash memory, a read-only memory (Read-Only Memory, ROM), a random access memory (Random Access Memory, RAM), a magnetic disk, an optical disc, or the like.

The method, system and device for quickly establishing a trunking service provided by the embodiments of the present invention are described above in detail. In this specification, specific embodiments are used to describe principles and implementation manners of the present invention. Descriptions of the foregoing embodiments are merely intended for helping understand the method and the core idea of the present invention. Meanwhile, a person of ordinary skill in the art may make modifications to the specific implementation manners and the application scope according to the idea of the present invention. In conclusion, content in this specification shall not be understood as a limitation on the present invention.

What is claimed is:

1. A method for quickly establishing a trunking service, the method comprising:
   receiving, by a base station device, indication information that a user equipment (UE) has entered a trunking service mode, wherein the indication information is sent by an evolved packet core network device;
   creating, by the base station device, a radio resource control connection with the UE, in responding to the indication information;
   generating, by the base station device, radio resource connection configuration information comprising a discontinuous reception cycle;
   sending, by the base station device, the radio resource connection configuration information to the UE for determining the discontinuous reception cycle as a discontinuous reception cycle of the UE; and
   when the UE is in the trunking service mode, retaining, by the base station device, the radio resource control connection with the UE according to the radio resource connection configuration information.

2. The method according to claim 1, wherein receiving, by a base station device, indication information that a UE has entered a trunking service mode, wherein the indication information is sent by an evolved packet core network device comprises:
   receiving, by the base station device, a bearer establishment request or a context modification request sent by the evolved packet core network device, wherein the request carries a quality of service class identifier parameter of a trunking service bearer, and the quality of service class identifier parameter of the trunking service bearer is used to instruct the UE to enter the trunking service mode.

3. The method according to claim 1, wherein receiving, by a base station device, indication information that a UE has entered a trunking service mode, wherein the indication information is sent by an evolved packet core network device comprises:
   receiving, by the base station device, a bearer establishment request or a context modification request sent by the evolved packet core network device, wherein the request carries a trunking service identifier, and the trunking service identifier is used to instruct the UE to enter the trunking service mode.

4. The method according to claim 1, wherein responding, by the base station device, to the indication information, and creating a radio resource control connection with the UE comprises:
   responding, by the base station device, to the indication information, and sending a radio resource control connection reconfiguration request to the UE; and
   receiving, by the base station device, a radio resource control connection reconfiguration completion response returned by the UE.

5. The method according to claim 1, wherein generating radio resource connection configuration information comprising a discontinuous reception cycle comprises:
   generating the radio resource connection configuration information comprising a first discontinuous reception cycle and a second discontinuous reception cycle, wherein the first discontinuous reception cycle is smaller than the second discontinuous reception cycle.

6. A method for quickly establishing a trunking service, the method comprising:
   sending, by a user equipment (UE) by using an evolved packet core network device, indication information that the UE has entered a trunking service mode to a base station device, the indication information is used to trigger the base station device to create a radio resource control connection with the UE, generate radio resource connection configuration information comprising a discontinuous reception cycle, and send the radio resource connection configuration information to the UE;
   receiving, by the UE, the radio resource connection configuration information that is sent by the base station device and comprises the discontinuous reception cycle, and configuring the discontinuous reception cycle as a discontinuous reception cycle of the UE itself; and when the UE is in the trunking service mode, retaining the radio resource control connection with the base station device according to the radio resource connection configuration information.

7. The method according to claim 6, wherein sending, by a UE by using an evolved packet core network device, indication information that the UE has entered a trunking service mode to a base station device comprises:

sending, by the UE by using the evolved packet core network device, a bearer establishment request or a context modification request to the base station device, wherein the request carries a quality of service class identifier parameter of a trunking service bearer, and the quality of service class identifier parameter of the trunking service bearer is used to instruct the UE to enter the trunking service mode.

8. The method according to claim 6, wherein sending, by a UE by using an evolved packet core network device, indication information that the UE has entered a trunking service mode to a base station device comprises:

sending, by the UE by using the evolved packet core network device, a bearer establishment request or a context modification request to the base station device, wherein the request carries a trunking service identifier, and the trunking service identifier is used to instruct the UE to enter the trunking service mode.

9. The method according to claim 6, wherein receiving, by the UE, the radio resource connection configuration information that is sent by the base station device and comprises the discontinuous reception cycle, and configuring the discontinuous reception cycle as a discontinuous reception cycle of the UE itself comprises:

receiving, by the UE, the radio resource connection configuration information that is sent by the base station device and comprises a first discontinuous reception cycle and a second discontinuous reception cycle, wherein the first discontinuous reception cycle is smaller than the second discontinuous reception cycle; and configuring, by the UE, the first discontinuous reception cycle or the second discontinuous reception cycle as the discontinuous reception cycle of the UE itself.

10. A base station device, comprising:
a receiver, configured to receive indication information that a user equipment (UE) has entered a trunking service mode, wherein the indication information is sent by an evolved packet core network device;
a processor, configured to create a radio resource control connection with the UE, in responding to the indication information, and configured to generate radio resource connection configuration information comprising a discontinuous reception cycle;
a transmitter, configured to send the radio resource connection configuration information generated by the processor to the UE for determining the discontinuous reception cycle as a discontinuous reception cycle of the UE; and
wherein the processor is further configured to: when the UE is in the trunking service mode, retain the radio resource control connection with the UE according to the radio resource connection configuration information.

11. The base station device according to claim 10, wherein the receiver is configured to receive a bearer establishment request or a context modification request sent by the evolved packet core network device, wherein the request carries a quality of service class identifier parameter of a trunking service bearer, and the quality of service class identifier parameter of the trunking service bearer is used to instruct the UE to enter the trunking service mode.

12. The base station device according to claim 10, wherein the receiver is configured to receive a bearer establishment request or a context modification request sent by the evolved packet core network device, wherein the request carries a trunking service identifier, and the trunking service identifier is used to instruct the UE to enter the trunking service mode.

13. The base station device according to claim 10, wherein the processor is configured to respond to the indication information received by the receiving unit, send a radio resource control connection reconfiguration request to the UE, and receive a radio resource control connection reconfiguration completion response returned by the UE.

14. The base station device according to claim 10, wherein the processor is configured to generate the radio resource connection configuration information comprising a first discontinuous reception cycle and a second discontinuous reception cycle, and the first discontinuous reception cycle is smaller than the second discontinuous reception cycle.

15. A user equipment (UE), comprising:
a transmitter, configured to send, by using an evolved packet core network device, indication information that the UE has entered a trunking service mode to a base station device, the indication information is used to trigger the base station device to create a radio resource control connection with the UE, generate radio resource connection configuration information comprising a discontinuous reception cycle, and send the radio resource connection configuration information to the UE;
a receiver, configured to: after the transmitter sends, by using the evolved packet core network device, the indication information that the UE has entered the trunking service mode to the base station device, receive the radio resource connection configuration information that is sent by the base station device and comprises the discontinuous reception cycle; and
a processor, configured to:
configure the discontinuous reception cycle received by the receiver as a discontinuous reception cycle of the UE itself, and
when the UE is in the trunking service mode, retain the radio resource control connection with the base station device according to the radio resource connection configuration information received by the receiver.

16. The UE according to claim 15, wherein the transmitter is configured to send a bearer establishment request or a context modification request to the base station device by using the evolved packet core network device, the request carries a quality of service class identifier parameter of a trunking service bearer, and the quality of service class identifier parameter of the trunking service bearer is used to instruct the UE to enter the trunking service mode.

17. The UE according to claim 15, wherein the transmitter is configured to send a bearer establishment request or a context modification request to the base station device by using the evolved packet core network device, the request carries a trunking service identifier, and the trunking service identifier is used to instruct the UE to enter the trunking service mode.

18. The UE according to claim 15, wherein:
the receiver is configured to receive the radio resource connection configuration information that is sent by the base station device and comprises a first discontinuous reception cycle and a second discontinuous reception cycle, wherein the first discontinuous reception cycle is smaller than the second discontinuous reception cycle; and the processor is configured to configure the first discontinuous reception cycle or the second discontinuous reception cycle that are received by the receiver as the discontinuous reception cycle of the UE itself.

* * * * *